(12) United States Patent
Feldmeier et al.

(10) Patent No.: US 8,810,998 B2
(45) Date of Patent: Aug. 19, 2014

(54) MOTOR CONTROL CENTER AND COMMUNICATION SYSTEM THEREFOR

(75) Inventors: Gerald Raymond Feldmeier, Glendale, WI (US); Edgar Yee, Chapel Hill, NC (US); Robert Allan Morris, Fayetteville, NC (US)

(73) Assignee: Eaton Corporation, Cleveland, OH (US)

( * ) Notice: Subject to any disclaimer, the term of this patent is extended or adjusted under 35 U.S.C. 154(b) by 163 days.

(21) Appl. No.: 13/453,283

(22) Filed: Apr. 23, 2012

(65) Prior Publication Data

US 2013/0279081 A1 Oct. 24, 2013

(51) Int. Cl.
| | |
|---|---|
| *H02B 11/12* | (2006.01) |
| *H02H 5/04* | (2006.01) |
| *H02H 7/09* | (2006.01) |
| *H02B 1/04* | (2006.01) |
| *H02B 1/26* | (2006.01) |

(52) U.S. Cl.
CPC .............. *H02B 11/12* (2013.01); *H02B 1/04* (2013.01); *H02H 5/04* (2013.01); *H02H 7/09* (2013.01)
USPC ........... 361/608; 361/610; 361/614; 361/622; 361/636; 312/223.1; 312/223.2; 312/236; 312/296; 700/292; 700/293; 700/296

(58) Field of Classification Search
CPC .............. H02B 1/03; H02B 1/04; H02B 1/26; H02B 11/12; H02B 13/02; H02B 1/21; H02B 1/36; H02B 11/00; H02H 5/04; H02H 7/08; H02H 7/09; H05K 7/14; H05K 5/00; H05K 7/02; H05K 13/00
USPC ......... 361/605, 608, 610, 616, 622, 624, 627, 361/24, 30–33, 62, 64, 96, 115, 172, 640, 361/648; 700/12, 19, 72, 63, 83, 292–296; 312/223.1, 223.2, 283, 329, 107, 111, 312/199, 213; 439/95, 638, 246, 247, 248; 200/50.01–50.26, 50.32–50.43, 293, 200/400, 401, 331, 500, 501, 318–327
See application file for complete search history.

(56) References Cited

U.S. PATENT DOCUMENTS

| | | | | |
|---|---|---|---|---|
| 2,688,716 | A | * | 9/1954 | Eging ........................... 361/610 |
| 3,142,003 | A | * | 7/1964 | Olashaw ....................... 361/608 |

(Continued)

FOREIGN PATENT DOCUMENTS

| | | | | |
|---|---|---|---|---|
| KR | 952984 | B1 | * 4/2010 | ............... H02B 1/03 |

*Primary Examiner* — Michael V Datskovskiy
(74) *Attorney, Agent, or Firm* — Eckert Seamans Cherin & Mellott, LLC; Grant E. Coffield

(57) ABSTRACT

A communication system is provided for a motor control center. The motor control center includes an enclosure and a plurality of subunits. The enclosure comprises a framework for dividing the enclosure into a plurality of compartments. The subunits are removably disposed within the compartments. The communication system includes a mounting bracket fixedly attached to the framework, within a corresponding one of the compartments, and a communication module mounted on the mounting bracket. The communication module includes a housing and a number of features such as, for example and without limitation, a DIP switch and electrical connector(s), disposed on the housing. Accordingly, when the subunit is removed from the compartment, the communication module remains, fixed to the enclosure framework. The mounting bracket includes a hinge that allows the communication module to pivot with respect to the compartment to provide access to the features.

20 Claims, 6 Drawing Sheets

(56) References Cited

U.S. PATENT DOCUMENTS

| | | | |
|---|---|---|---|
| 4,777,559 A * | 10/1988 | Bar et al. | 361/610 |
| 5,867,364 A * | 2/1999 | Roberson | 361/610 |
| 6,512,669 B1 * | 1/2003 | Goodwin et al. | 361/601 |
| 7,419,394 B2 * | 9/2008 | Jensen et al. | 439/248 |
| 7,525,809 B2 * | 4/2009 | Bergmann et al. | 361/752 |
| 7,684,199 B2 | 3/2010 | Yee et al. | |
| 7,688,572 B2 | 3/2010 | Yee et al. | |
| 8,144,438 B2 * | 3/2012 | Rivers et al. | 361/23 |
| 8,274,782 B2 * | 9/2012 | Blodorn et al. | 361/622 |
| 2008/0022673 A1 | 1/2008 | Morris et al. | |
| 2008/0258667 A1 | 10/2008 | Morris et al. | |
| 2011/0149480 A1 | 6/2011 | Leeman et al. | |

* cited by examiner

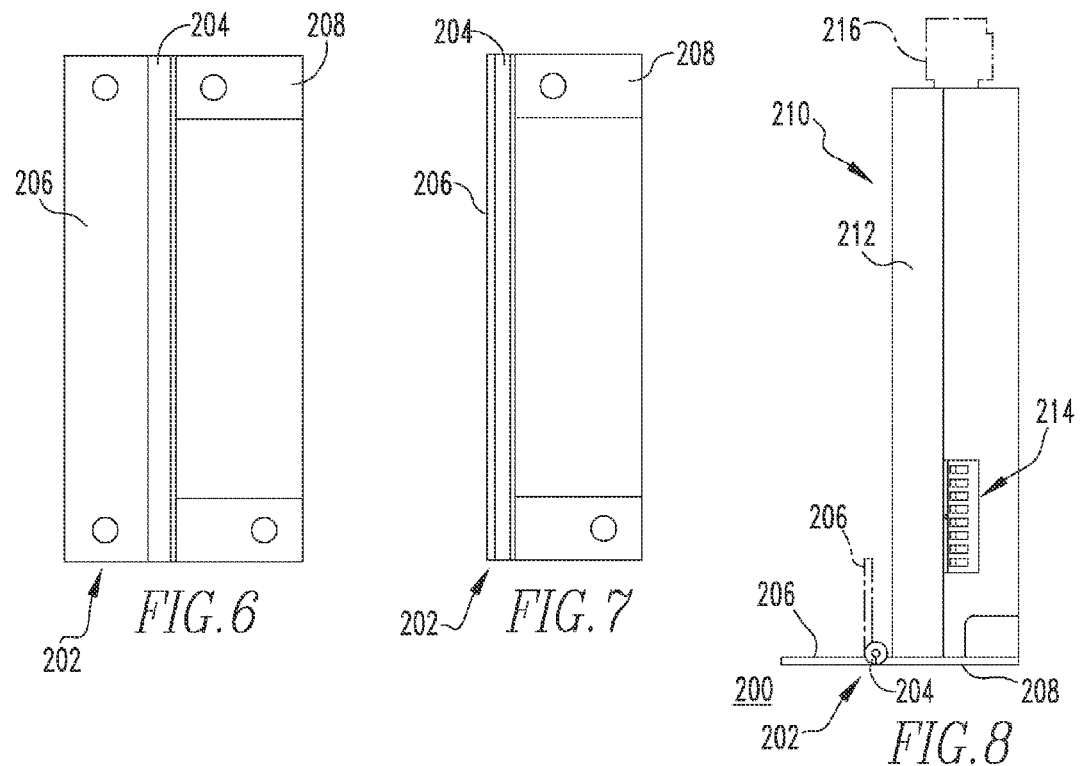
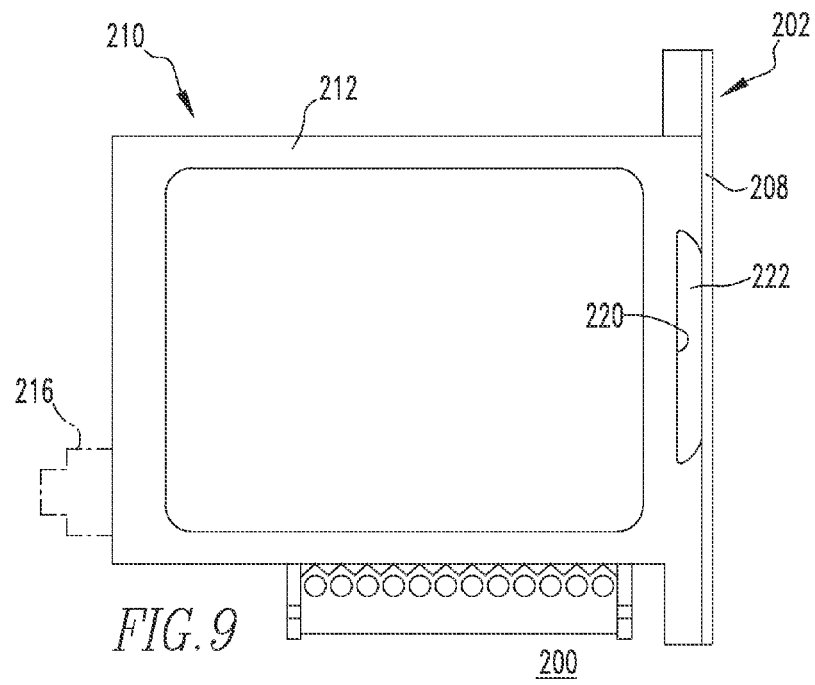

MOTOR CONTROL CENTER AND COMMUNICATION SYSTEM THEREFOR

BACKGROUND

1. Field

The disclosed concept relates generally to motor control systems, and more particularly, to motor control centers. The disclosed concept also relates to communication systems for motor control centers.

2. Background Information

Motor control centers are used, for example, in some commercial and industrial applications to distribute electrical power to a variety of loads (e.g., without limitation, relatively high power electrical motors, pumps, and other loads).

FIG. 1, for example, shows a portion of a motor control center 10. The motor control center 10 includes a multi-compartment enclosure 12 for receiving a plurality of motor control modules or subunits 14,16,18,20,22,24, commonly referred to as "buckets". Typically, each bucket (see, e.g., bucket 22 of FIG. 1) is a removable, pull-out subunit that has, or is installed behind, a door 26. The door 26 is preferably coupled to the enclosure 12 by hinges 28 (shown in phantom line drawing in FIG. 1) to permit access to motor control components of the bucket 22 while it is installed in the enclosure 12. Motor control centers and subunits therefor are described in greater detail, for example, in commonly assigned U.S. Pat. Nos. 7,684,199 and 7,688,572 and U.S. Patent Application Publications 2011/0149480, 2008/0258667, and 2008/0022673, all of which are hereby incorporated herein by reference.

Traditionally, communication network systems are motor control center subunit-based. That is, the communication modules for the systems are mounted on the subunits or buckets such that, when a subunit or bucket is removed, the corresponding communication module is also removed. This can cause a wide variety of problems. For example, when a bucket including the communication module is unplugged from the motor control center, the computerized controlling program loses the connection which may cause a malfunction of the system. Furthermore, the buckets are replaced or rearranged on a relatively regular basis, which means the main software program would need to be configured. This would require expert assistance to re-address all of the buckets. Among other disadvantages, are lost production, due to downtime to address the system failure.

There is room for improvement in motor control centers, and in communication systems therefor.

SUMMARY

These needs and others are met by embodiments of the disclosed concept, which are directed to a communication system for a motor control center wherein, among other benefits, the communication module of the system is based in the motor control center structure rather than being removable with the individual subunit or bucket.

As one aspect of the disclosed concept, a communication system is provided for a motor control center. The motor control center includes an enclosure and a plurality of subunits. The enclosure comprises a framework for dividing the enclosure into a plurality of compartments. The subunits are removably disposed within the compartments. The communication system comprises: a mounting bracket structured to be fixedly attached to the framework within a corresponding one of the compartments, the mounting bracket comprising a hinge; and a communication module mounted on the mounting bracket, the communication module comprising a housing and a number of features disposed on the housing. The hinge of the mounting bracket is structured to allow the communication module to pivot with respect to the compartment to provide access to the features.

The mounting bracket may further comprise a first portion and a second portion, wherein the hinge pivotably couples the first portion to the second portion. The first portion may be structured to be fixedly attached to the framework, and the communication module may be mounted on the second portion.

The communication system may further comprise a plurality of wireways, and the enclosure of the motor control center may further comprise a top, a bottom, a first end, and a second end. A plurality of the compartments may be disposed one on top of another to form a number of columns between the first end and the second end of the enclosure. Each of the columns may include a first side and a second side disposed opposite and distal from the first side, and each of the columns may include a plurality of wireways. A first wireway may extend between the top and the bottom of the enclosure adjacent to the first side of a corresponding one of the columns, and a second wireway may extend between the top and the bottom of the enclosure adjacent to the second side of the corresponding one of the columns. The communication module may further comprise a plurality of cables or wires, wherein at least one of the cables or wires is disposed in each of the first wireway and the second wireway.

The communication system may further comprising a shield for shielding electromagnetic interference between a number of cables or wires disposed in the wireways.

A motor control center employing the aforementioned communication system, is also disclosed.

BRIEF DESCRIPTION OF THE DRAWINGS

A full understanding of the disclosed concept can be gained from the following description of the preferred embodiments when read in conjunction with the accompanying drawings in which:

FIG. 6 is a front elevation view of a mounting bracket for a communication module of the communication system, in accordance with an embodiment of the disclosed concept, showing the mounting bracket in the open position;

FIG. 7 is a front elevation view of the mounting bracket of FIG. 6, modified to show the bracket in the closed position;

FIG. 8 is a top plan view of the mounting bracket of FIG. 7, shown with a communication module mounted thereto, in accordance with an embodiment of the disclosed concept; and FIG. 9 is a side elevation view of the mounting bracket and communication module of FIG. 8.

DESCRIPTION OF THE PREFERRED EMBODIMENTS

Figure 1:
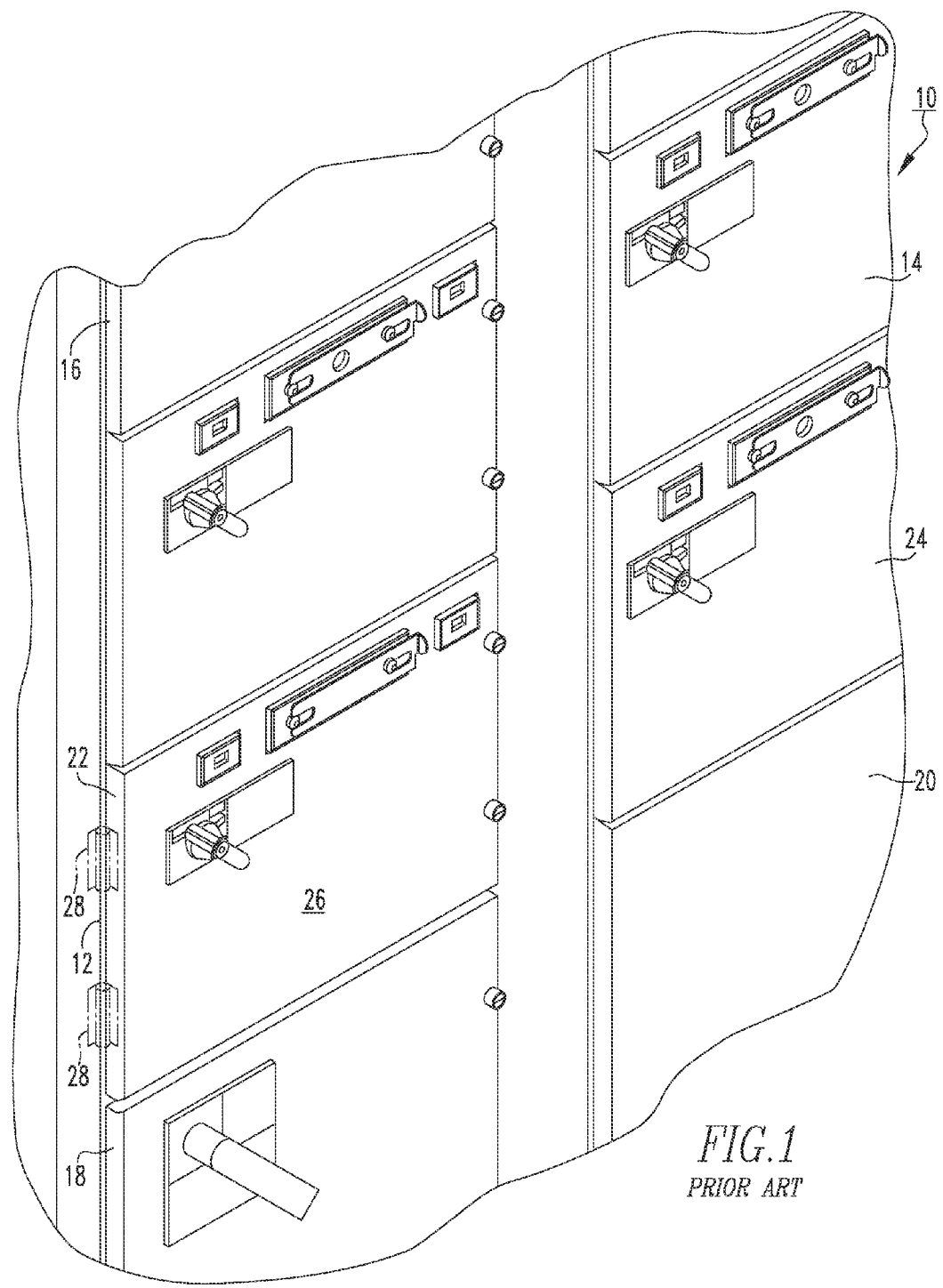
FIG. 1 is an isometric view of a portion of a motor control center and subunits therefor.

Directional phrases used herein, such as, for example, left, right, front, back, top, bottom and derivatives thereof, relate to the orientation of the elements shown in the drawings and are not limiting upon the claims unless expressly recited therein.

As employed herein, the term "motor control center" refers to any known or suitable low voltage control gear expressly including, but not limited to, switchboards.

As employed herein, the term "low voltage control gear" refers to any known or suitable electrical apparatus having a horizontal bus feeding a series of vertical buses and associated electrical switching apparatus or subunits and expressly includes, but is not limited to, motor control centers and switchboards.

As employed herein, the term "fastener" refers to any suitable connecting or tightening mechanism expressly including, but not limited to, rivets, screws, bolts and the combinations of bolts and nuts (e.g., without limitation, lock nuts) and bolts, washers and nuts.

As employed herein, the statement that two or more parts are "connected" or "coupled" together shall mean that the parts are joined together either directly or joined through one or more intermediate parts. Further, as employed herein, the statement that two or more parts are "attached" shall mean that the parts are joined together directly.

As employed herein, the term "number" shall mean one or an integer greater than one (i.e., a plurality).

Figure 2:
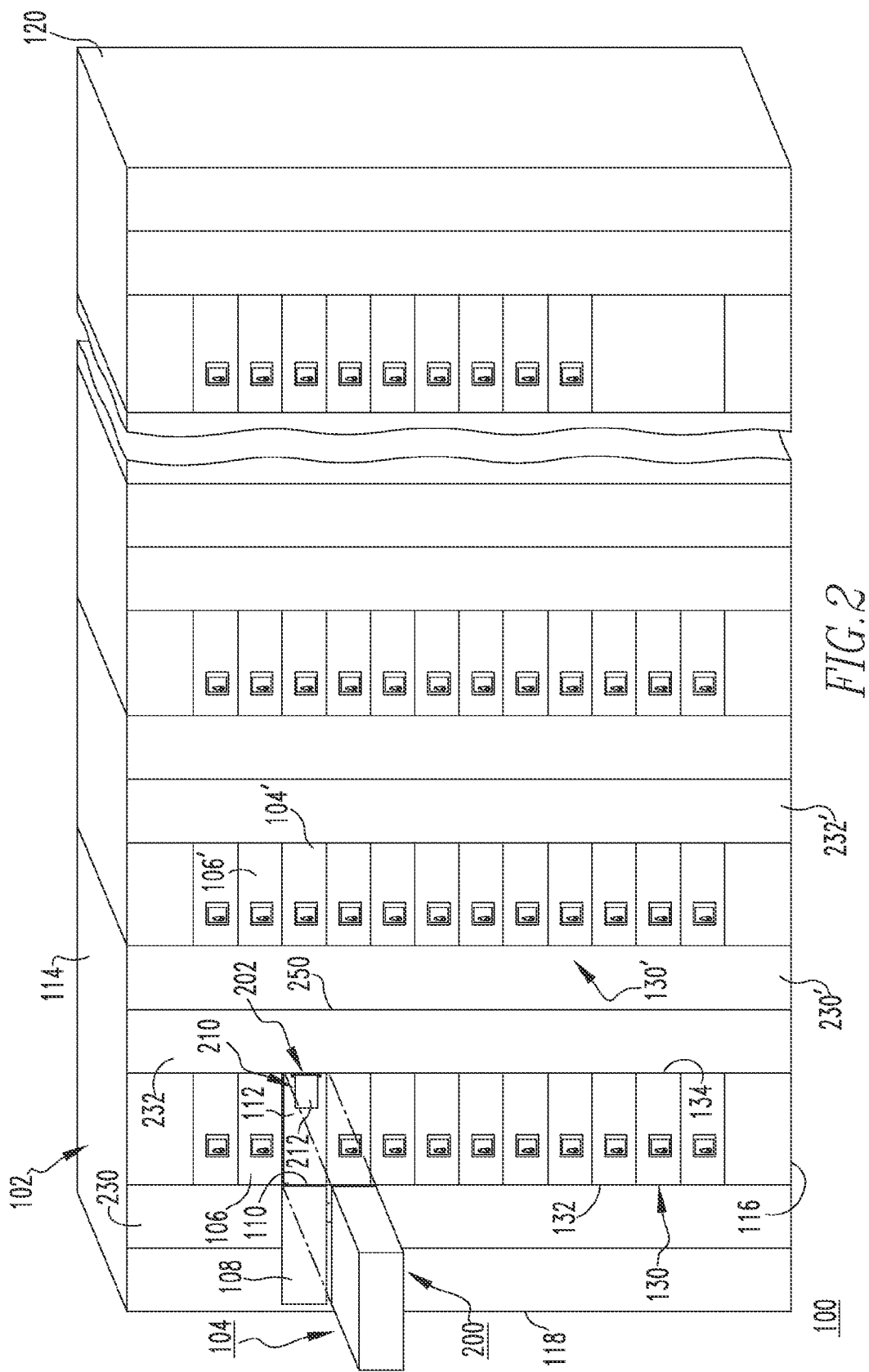
FIG. 2 is a simplified isometric view of a motor control center and communication system therefor, in accordance with an embodiment of the disclosed concept, showing one subunit being withdrawn from the motor control center enclosure.
Figure 3:
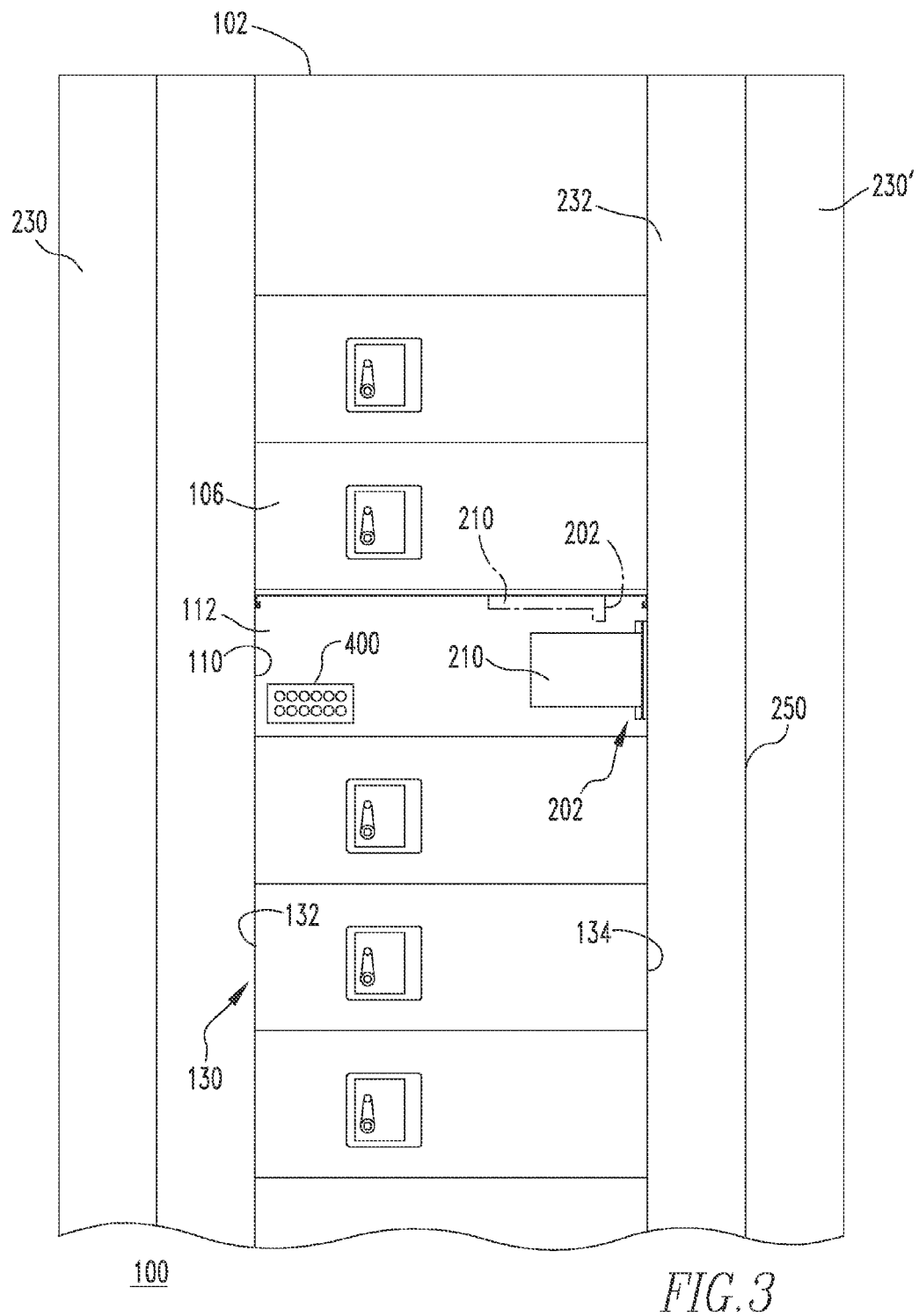
FIG. 3 is a simplified front elevation view of a portion of the motor control center and communication system therefor of FIG. 2, shown after the subunit has been removed.
Figure 4:
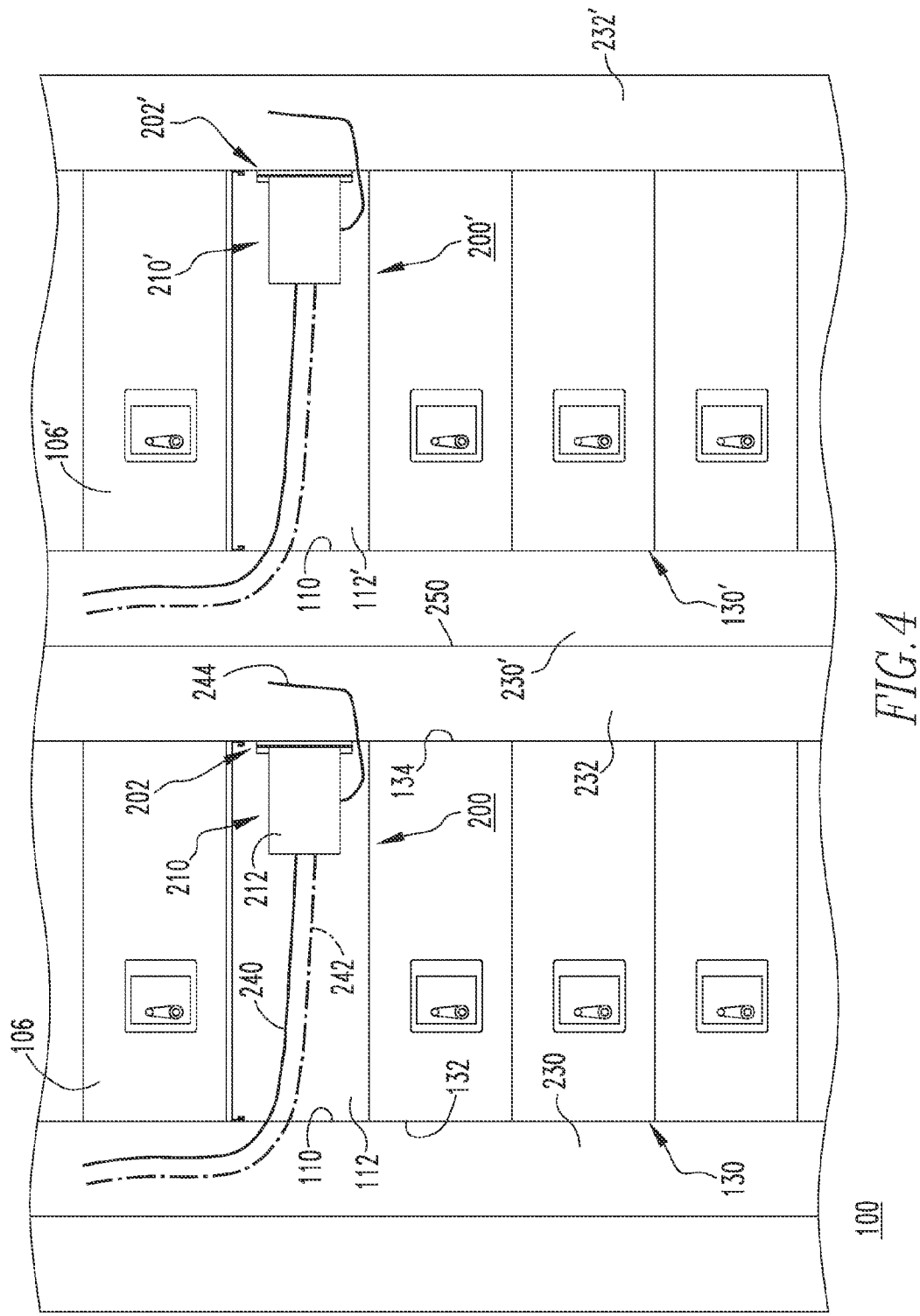
FIG. 4 is a simplified front elevation view another portion of the motor control center, and communication system and wireways therefor, in accordance with an embodiment of the disclosed concept.
Figure 5:
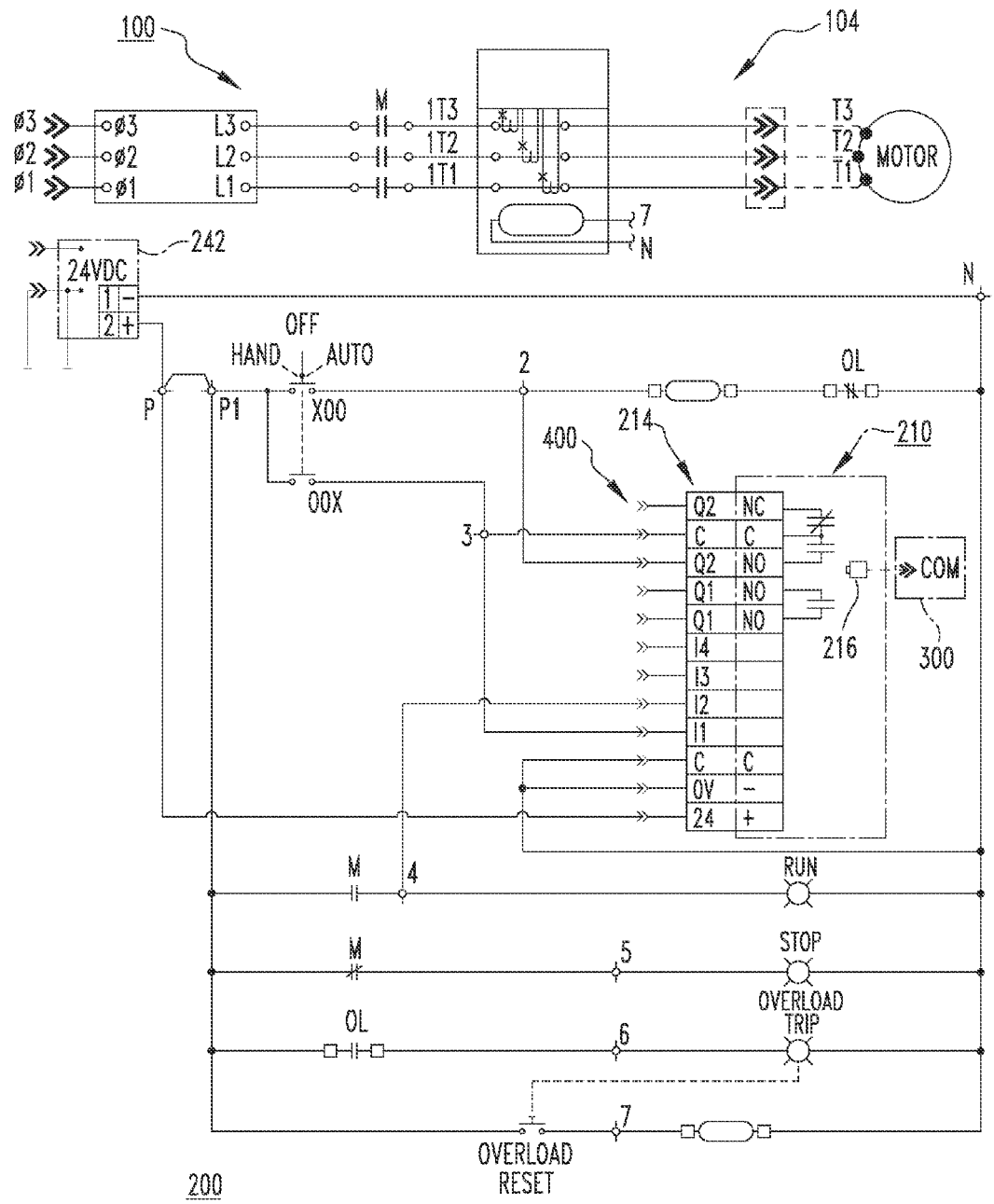
FIG. 5 is a schematic diagram for the motor control center and communication system therefor.

FIGS. 2-4 show a communication system 200 for a motor control center 100 (partially shown in FIGS. 2-4; shown schematically in FIG. 5). The motor control center 100 includes an enclosure 102 and a plurality of subunits 104,106 (see also subunits 104' and 106' in FIGS. 2 and 4). More specifically, the enclosure 102 comprises a framework 110 for dividing the enclosure 102 into a plurality of compartments 112 (see also compartment 112' of FIG. 4).

As best shown in FIG. 2, each subunit 104 (shown in simplified form in FIG. 2) is removably disposed within a corresponding compartment 112. In the example shown, the compartment 112 includes a pivotable door 108, which is shown in the open position, to permit the subunit 104 to be removed from the enclosure compartment 112. It will be appreciated that such door (e.g., without limitation, door 108), or other suitable cover (not shown), has been removed in FIGS. 3 and 4 for ease of illustration. It will further be appreciated that the motor control center 100 may have any known or suitable alternative number and/or configuration (not shown) of subunits (e.g., 104,104',106,106') other than what is shown and described herein, without departing from the scope of the disclosed concept.

The communication system 200 includes a mounting bracket 202 (best shown in FIGS. 6-9), which is fixedly attached to the framework 110 of the motor control center enclosure 102, within a corresponding one of the compartments 112 thereof (see also mounting bracket 202' attached to framework 110 within compartment 112' of FIG. 4). Among other benefits, the mounting bracket 202 includes a hinge 204. A communication module 210 (best shown in FIGS. 8 and 9; shown in simplified form in FIGS. 2-4; shown schematically in phantom line drawing in FIG. 5) is mounted on the mounting bracket 202.

As best shown in FIGS. 8 and 9, the communication module 210 includes a housing 212 having a number of features 214,216 disposed thereon. The hinge 204 is structured to allow the communication module to pivot (e.g., without limitation, between an opened position, shown in solid line drawing in FIG. 8, and a closed position, partially shown in phantom line drawing in FIG. 8) with respect to the compartment 112. In this manner, the hinged mounting bracket 202 provides access to the communication module features 214,216, as will be discussed in greater detail hereinbelow.

As shown in FIGS. 6-8, the mounting bracket 202 preferably includes a first portion 206, and a second portion 208, wherein the hinge 204 pivotably couples the first portion 206 to the second portion 208. In the example shown and described herein, the first portion 206 is fixedly attached to the framework 110 of the motor control center 100 (see, for example and without limitation, FIGS. 2-4). The communication module 210 is mounted on the second portion 208 in any known or suitable manner. For example and without limitation, a plurality of fasteners could be employed both to suitably fasten the first portion 206 to the framework 110, and to fasten the communication module 210 to the second portion 208 of the mounting bracket 202. In addition, or alternatively, the housing 212 of the communication module 210 may include a recessed channel 220, and the second portion 208 of the mounting bracket 202 may include a DIN rail 222, wherein the DIN rail 222 is structured to be disposed in the recessed channel 220 to secure the communication module 210 to the second portion 208 of the mounting bracket 202 in a generally well known manner, as shown in FIG. 9.

Referring again to FIG. 3, it will be appreciated that the communication module 210 and, in particular, the mounting bracket 202 therefor, could be suitably attached within the corresponding compartment 112 of the motor control center enclosure 102 in any known or suitable configuration. For example and without limitation, the bracket 202 and communication module 210 may be mounted on the side (e.g., right side from the perspective of FIG. 3) of the framework 110 of the compartment 112, as shown in solid line drawing in FIG. 3, or on the top framework 110 of the compartment 112, as shown in simplified form in phantom line drawing in FIG. 3. Regardless of the mounting location within the compartment 112, it will be appreciated that, in accordance with the disclosed concept, the communication module 210 remains disposed within the compartment 112 and fixedly attached to the motor control center 100, even when the corresponding subunit (see, for example, subunit 104 of FIG. 2) has been removed from the compartment 112. Among other benefits, this advantageously keeps the communication system 200 intact (e.g., without limitation, the specific position within the motor control center 100 can be readily identified and verified).

One difficulty associated with maintaining the communication module 210 fixedly attached within the compartment 112 in such a structured-based manner, is the ability to access the aforementioned features (e.g., without limitation, features 214,216 (FIGS. 8 and 9)) of the communication module 210, within the relatively tight confines of the compartment 112. In the non-limiting example shown and described herein, the features 214,216 include at least one switch 214 (see, for example and without limitation, DIP switch 214 of FIG. 8; also shown schematically in FIG. 5), and at least one connector 216 (see, for example, Ethernet receptacle 216 (shown in simplified form in phantom line drawing in FIGS. 8 and 9; also shown schematically in FIG. 5)). For example and without limitation, motor control center users must be able to access the DIP switch 214 (FIG. 8) when the subunit (see, for example, subunit 104 of FIG. 2) is removed. It will be appreciated that the communication module 210 is suitable for protocol such as, for example and without limitation, Ethernet and Modbus protocols. However, any known or suitable alternative protocol option could be employed, without departing from the disclosed concept. In any event, such protocol options need to ID register in the form of the DIP switch 214 to arrange a specific address code. It will also be appreciated that the communication module 210 is capable, for example, of being addressed remotely, for example and without limitation, using any known or suitable website based software, a home computer, or any other suitable communication element 300 (see, for example and without limitation, communication element 300 shown in simplified form in phantom line drawing in FIG. 5).

Accordingly, the disclosed communication system 200 provides a mechanism for keeping the communication module 210 in a fixed position relative to the motor control center 100, while allowing it to pivot on a unique mounting bracket 202 mounted to the motor control center enclosure framework 110, within a corresponding compartment 112 of the enclosure 102. In this manner, the advantages of hard-mounting the communication module 210, such that it is fixed to the motor control center 100, are realized, while at the same time providing necessary access to communication module features (e.g., without limitation, switches 214; connectors 216).

In addition to the foregoing, the disclosed communication system 200 preferably further includes a number of additional unique and advantageous features. For example and without limitation, the example communication system 200, preferably includes a plurality of wireways 230,232 (FIGS. 2-4; see also wireways 230',232' of FIGS. 2 and 4), which comprise passageways for cables or wires 240,242,244 (see, for example cables 240,242,244 partially shown in simplified form in FIG. 4). More specifically, as shown in FIG. 2, the motor control center enclosure 102 includes a top 114, a bottom 116, and opposing first and second ends 118,120. A plurality of the aforementioned compartments 112 (see also compartment 112' of FIG. 4) are disposed one on top of another to form a number of columns 130,130'. Four such columns (e.g., 130,130') are shown in FIG. 2, one column 130 is shown in FIG. 3, and portions of two columns 130,130' are shown in FIG. 4.

As best shown with reference to column 130 in FIG. 4, it will be appreciated that each of the columns (e.g., 130) includes a first side 132 and a second side 134 disposed opposite and distal from the first side 132. In accordance with the disclosed concept, each of the columns 130 also includes a plurality of wireways 230,232. More specifically, as shown in FIG. 4, a first wireway 230 extends longitudinally between the top and bottom 114,116 of the motor control center enclosure 102, adjacent to the first side 132 of the column 130, and a second wireway 232 extends in a similar manner adjacent to the second side 134 of the column 130. Accordingly, wireways 230,232 (see also wireways 230',232') are provided on both sides 132,134 of the compartments 112, such that wires or cables 240,242,244 can neatly and effectively extend from within the compartment 112 into and through an appropriate nearby wireway 230,232.

EXAMPLE

By way of a non-limiting example, which is provided solely for purposes of illustration and is not intended to limit the scope of the disclosed concept, in FIG. 4, an Ethernet cable 240 extends outwardly (e.g., to the left from the perspective of FIG. 4) from the communication module 210 and, in particular, from a connection with Ethernet connector 214 (shown in simplified form in FIGS. 8 and 9), and into wireway 230. A 24 VDC control circuit wire 242 (shown in simplified form in phantom line drawing in FIG. 4; also shown schematically in FIG. 5) also extends (e.g., to the left from the perspective of FIG. 4) toward and into the same wireway 230. A third cable, which in the example shown and described herein is a 120 VAC control circuit wire 244, extends in the opposite direction (e.g., to the right from the perspective of FIG. 4) into and through wireway 232 on the opposite side of the compartment 112.

Accordingly, it will be appreciated that the disclosed communication system 200 advantageously provides additional passageways (e.g., without limitation, wireways 230,230', 232,232') for accommodating any known or suitable type and/or configuration of wires or cables (e.g., without limitation, 240,242,244) associated with the communication module 210 and/or the motor control center compartment 112, generally.

The disclosed motor control center 100 also preferably further includes a shield 250 (FIGS. 2-4) for shielding electromagnetic interference that may occur between one or more of the aforementioned cables or wires (e.g., 240,242,244) within the wireways 230,230',232,232'. Preferably, the shield comprises a steel divider 250. In the example shown and described herein, the steel divider 250 is formed, at least in part, by the aforementioned framework 110 of the motor control center enclosure 102. More specifically, the additional wireway (e.g., 232) of the disclosed system 200 separates or divides at least adjacent wireways (see shield 250 between wireways 232' and 230 of FIGS. 2-4). In this manner, the shield 250 segregates, for example and without limitation, relatively big and bulky power cabling from relatively sensitive communication system wiring. Accordingly, the shield or steel divider 250 functions to turn each wireway 230,230', 232,232' into a segregated steel chamber, to isolate undesirable electromagnetic interference.

It will be appreciated that although that all of the foregoing advantageous features (e.g., without limitation, pivotable mounting bracket 202 for fixedly mounting the communication module 210 to the motor control center enclosure framework 110; unique configuration of a plurality of wireways 230,230',232,232'; shield 250) are described in combination hereinabove, for economy of disclosure, that embodiments featuring only one or two of these features are also within the scope of the disclosed concept.

While specific embodiments of the disclosed concept have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed concept which is to be given the full breadth of the claims appended and any and all equivalents thereof.

What is claimed is:

1. A communication system for a motor control center, said motor control center including an enclosure and a plurality of subunits, the enclosure comprising a framework for dividing said enclosure into a plurality of compartments, said subunits being removably disposed within said compartments, said communication system comprising:
   a mounting bracket structured to be fixedly attached to said framework within a corresponding one of said compartments, said mounting bracket comprising a hinge; and
   a communication module mounted on said mounting bracket, said communication module comprising a housing and a number of features disposed on said housing, wherein said hinge of said mounting bracket is structured to allow said communication module to pivot with respect to said compartment to provide access to said features.

2. The communication system of claim 1 wherein said mounting bracket further comprises a first portion and a second portion; and wherein said hinge pivotably couples the first portion to the second portion.

3. The communication system of claim 2 wherein the first portion is structured to be fixedly attached to said framework; and wherein said communication module is mounted on the second portion.

4. The communication system of claim 3 wherein the housing of said communication module includes a recessed channel; wherein the second portion of said mounting bracket includes a DIN rail; and wherein said DIN rail is disposed in said recessed channel.

5. The communication system of claim 1 wherein said number of features includes at least one switch and at least one connector; and wherein said communication module is structured to be pivotable on said mounting bracket to access said at least one switch and said at least one connector within said compartment.

6. The communication system of claim 1 further comprising a plurality of wireways; wherein the enclosure of said motor control center further comprises a top, a bottom, a first end, and a second end; wherein a plurality of said compartments are disposed one on top of another to form a number of columns of said compartments between the first end and the second end of the enclosure; wherein each of said columns includes a first side and a second side disposed opposite and distal from the first side; and wherein each of said columns includes a plurality of wireways.

7. The communication system of claim 6 wherein said plurality of wireways is a first wireway extending between the top and the bottom of the enclosure adjacent to the first side of a corresponding one of said columns, and a second wireway extending between the top and the bottom of the enclosure adjacent to the second side of said corresponding one of said columns; wherein said communication module further comprises a plurality of cables or wires; and wherein at least one of said cables or wires is disposed in each of said first wireway and said second wireway.

8. The communication system of claim 6 further comprising a shield for shielding electromagnetic interference between a number of cables or wires disposed in said wireways.

9. The communication system of claim 8 wherein said shield is steel divider; and wherein said steel divider is formed at least in part by said framework.

10. The communication system of claim 1 further comprising a communication element for communicating with said communication module.

11. A motor control center comprising:
an enclosure comprising a framework for dividing said enclosure into a plurality of compartments;
a plurality of subunits, said subunits being removably disposed within said compartments; and
a communication system comprising:
a mounting bracket fixedly attached to said framework within a corresponding one of said compartments, said mounting bracket comprising a hinge, and
a communication module mounted on said mounting bracket, said communication module comprising a housing and a number of features disposed on said housing,
wherein said hinge of said mounting bracket allows said communication module to pivot with respect to said compartment to provide access to said features.

12. The motor control center of claim 11 wherein said mounting bracket further comprises a first portion and a second portion; and wherein said hinge pivotably couples the first portion to the second portion.

13. The motor control center of claim 12 wherein the first portion is fixedly attached to said framework; and wherein said communication module is mounted on the second portion.

14. The motor control center of claim 13 wherein the housing of said communication module includes a recessed channel; wherein the second portion of said mounting bracket includes a DIN rail; and wherein said DIN rail is disposed in said recessed channel.

15. The motor control center of claim 11 wherein said number of features includes at least one switch and at least one connector; and wherein said communication module is pivotable on said mounting bracket to access said at least one switch and said at least one connector within said compartment.

16. The motor control center of claim 11 further comprising a plurality of wireways; wherein the enclosure of said motor control center further comprises a top, a bottom, a first end, and a second end; wherein a plurality of said compartments are disposed one on top of another to form a number of columns of said compartments between the first end and the second end of the enclosure; wherein each of said columns includes a first side and a second side disposed opposite and distal from the first side; and wherein each of said columns includes a plurality of wireways.

17. The motor control center of claim 16 wherein said plurality of wireways is a first wireway extending between the top and the bottom of the enclosure adjacent to the first side of a corresponding one of said columns, and a second wireway extending between the top and the bottom of the enclosure adjacent to the second side of said corresponding one of said columns; wherein said communication module further comprises a plurality of cables or wires; and wherein at least one of said cables or wires is disposed in each of said first wireway and said second wireway.

18. The motor control center of claim 16 further comprising a shield for shielding electromagnetic interference between a number of cables or wires disposed in said wireways.

19. The motor control center of claim 18 wherein said shield is steel divider; and wherein said steel divider is formed at least in part by said framework.

20. The motor control center of claim 11 further comprising a communication element for communicating with said communication module.

* * * * *